(12) United States Patent
Sugimoto et al.

(10) Patent No.: US 11,734,543 B2
(45) Date of Patent: Aug. 22, 2023

(54) RFID TAG

(71) Applicant: KYOCERA Corporation, Kyoto (JP)

(72) Inventors: Yoshimasa Sugimoto, Kyoto (JP); Noritaka Niino, Kyoto (JP)

(73) Assignee: Kyocera Corporation, Kyoto (JP)

( * ) Notice: Subject to any disclaimer, the term of this patent is extended or adjusted under 35 U.S.C. 154(b) by 115 days.

(21) Appl. No.: 17/605,077

(22) PCT Filed: Apr. 17, 2020

(86) PCT No.: PCT/JP2020/016846
§ 371 (c)(1),
(2) Date: Oct. 20, 2021

(87) PCT Pub. No.: WO2020/218181
PCT Pub. Date: Oct. 29, 2020

(65) Prior Publication Data
US 2022/0188592 A1   Jun. 16, 2022

(30) Foreign Application Priority Data

Apr. 24, 2019   (JP) ................................. 2019-082401

(51) Int. Cl.
*G06K 19/077*   (2006.01)
(52) U.S. Cl.
CPC .............................. *G06K 19/07775* (2013.01)

(58) Field of Classification Search
CPC ......... G06K 19/07775; G06K 19/0772; G06K 19/07786; H01Q 9/285
USPC .......................................................... 235/492
See application file for complete search history.

(56) References Cited

U.S. PATENT DOCUMENTS

| | | | |
|---|---|---|---|
| 9,904,822 B1* | 2/2018 | Chen ................... | G06K 7/10297 |
| 2015/0109170 A1* | 4/2015 | Kang ................... | H04B 1/3833 |
| | | | 343/702 |
| 2019/0269914 A1* | 9/2019 | Moaddeb ............... | A61B 5/681 |
| 2019/0377914 A1* | 12/2019 | Horchak ............ | G06K 7/10386 |
| 2020/0018657 A1* | 1/2020 | Sim ..................... | H04M 1/0277 |

FOREIGN PATENT DOCUMENTS

JP   2016-053874 A   4/2016

* cited by examiner

*Primary Examiner* — Toan C Ly
(74) *Attorney, Agent, or Firm* — Volpe Koenig

(57) ABSTRACT

An RFID tag includes a circuit board, an RFID IC, a functional module, a case and a lid. The circuit board has a main part and an extended part. The extended part extends along an edge of the main part and includes an antenna conductor. The RFID IC is mounted on the circuit board. The functional module is disposed so as to overlap the circuit board. The case accommodates the circuit board and the functional module. The lid closes an opening of the case. The main part of the circuit board is held at a position away from an inner bottom surface of the case with the functional module as an obstacle in a direction toward the lid.

5 Claims, 10 Drawing Sheets

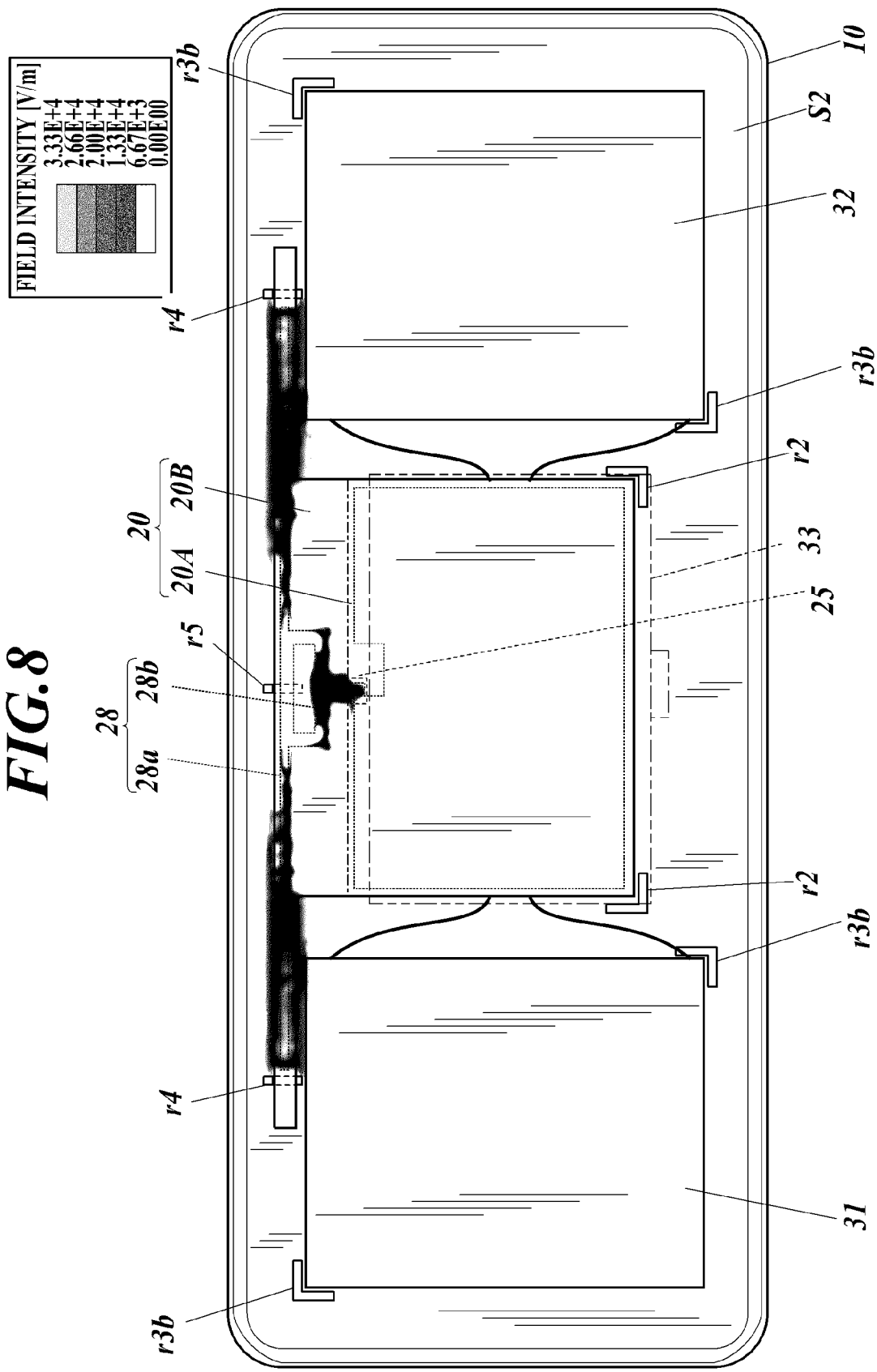

RFID TAG

TECHNICAL FIELD

The present disclosure relates to an RFID (Radio Frequency Identifier) tag having a structure in which an antenna conductor is accommodated in a case.

BACKGROUND

There is disclosed in JP 2016-53874 A an RFID tag in which resin is made to adhere to an antenna and an RFID IC with no space in order to prevent moisture ingress.

SUMMARY

An RFID tag according to the present disclosure includes:

a circuit board having a main part and an extended part extending along an edge of the main part and including an antenna conductor;

an RFID IC mounted on the circuit board;

a functional module disposed so as to overlap the circuit board;

a case that accommodates the circuit board and the functional module; and a lid that closes an opening of the case, wherein the extended part of the circuit board is kept in midair by the main part of the circuit board being at a position away from an inner bottom surface of the case with the functional module as an obstacle in a direction toward the lid.

BRIEF DESCRIPTION OF DRAWINGS

FIG. 8 shows field intensity of an antenna conductor.

DETAILED DESCRIPTION

Hereinafter, an embodiment of the present disclosure will be described in detail with reference to the drawings.

Figure 1:
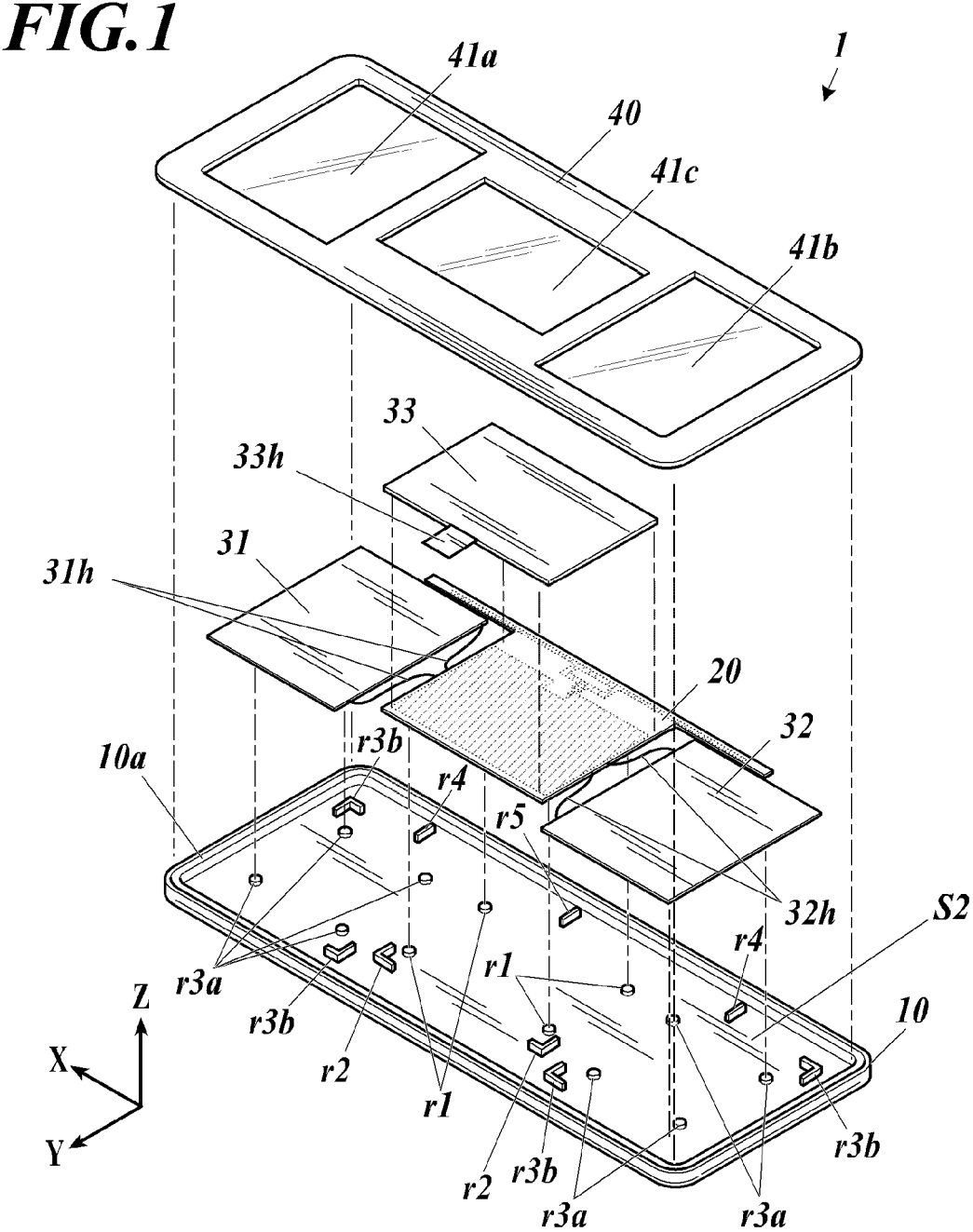
FIG. 1 is an exploded perspective view of an RFID tag of the present disclosure.
Figure 2:
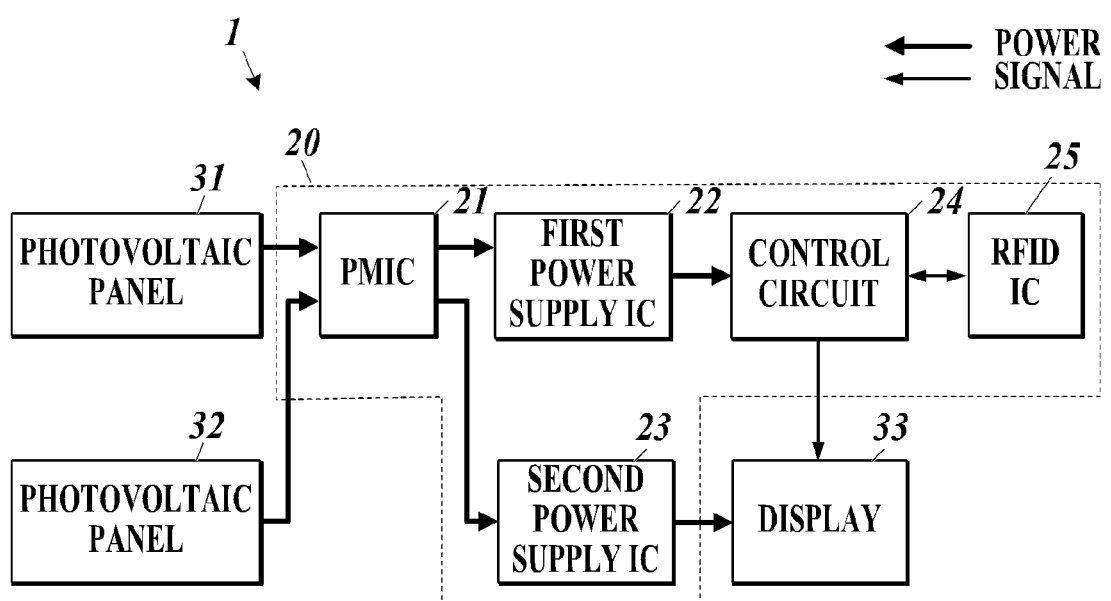
FIG. 2 is a block diagram showing circuit configuration of an RFID tag of an embodiment.
Figure 3:
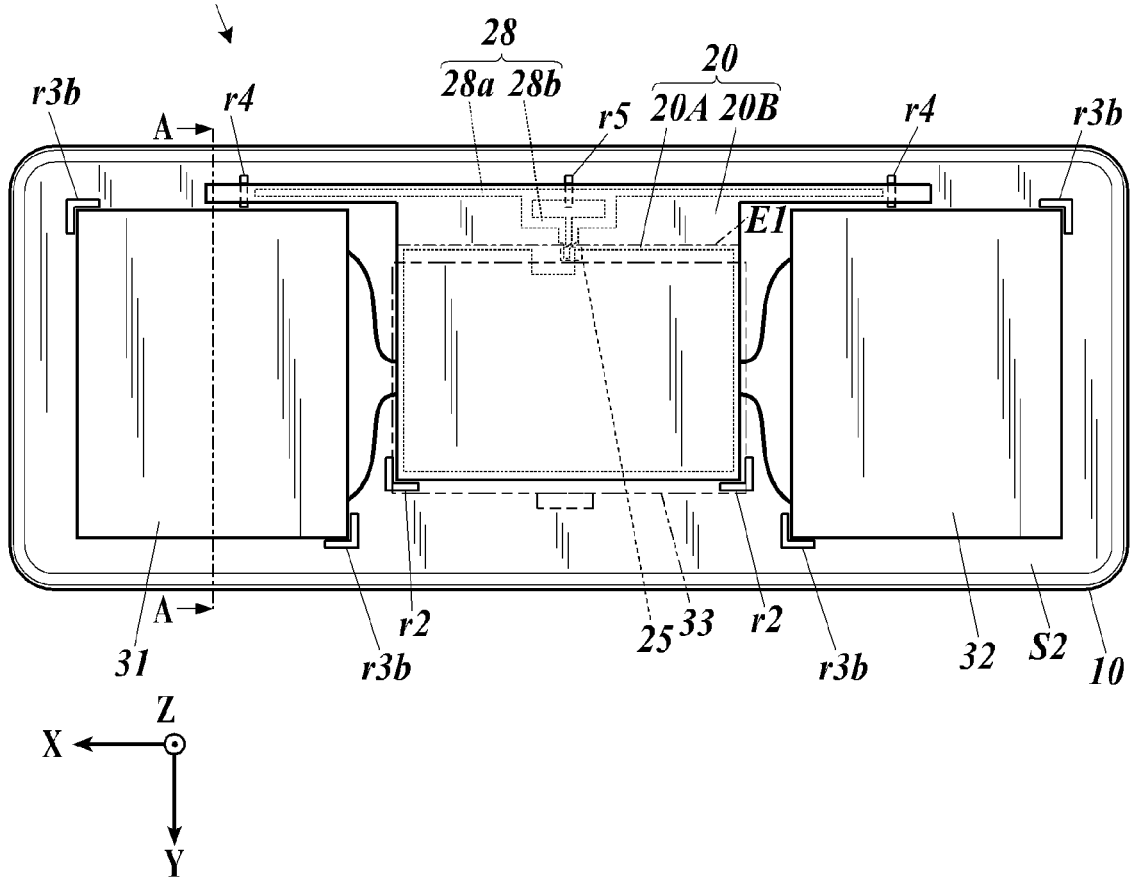
FIG. 3 is a plan view of configuration in which a circuit board and a functional module are mounted in a case.
Figure 4:
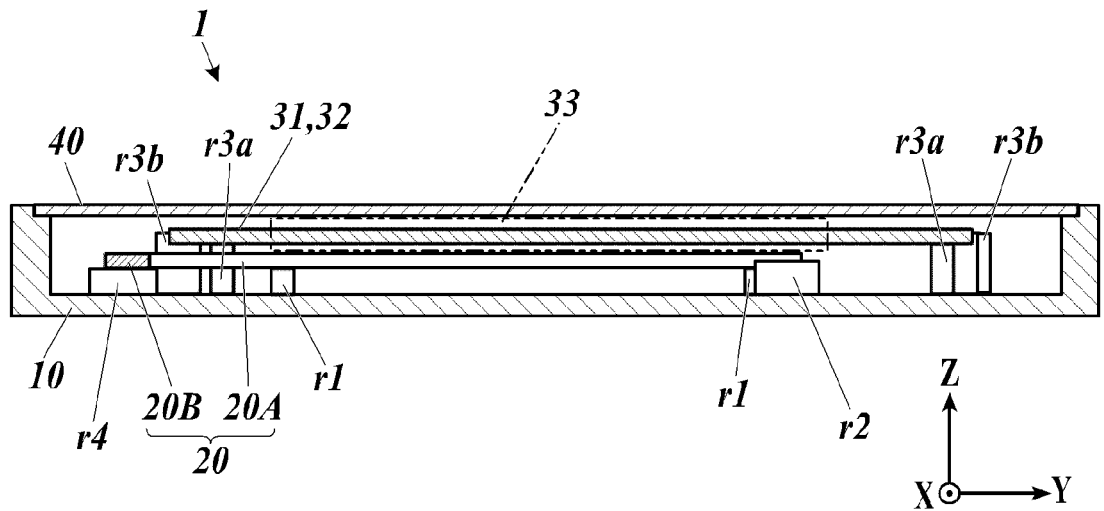
FIG. 4 is a vertical sectional view of the RFID tag of the embodiment.

FIG. 1 is an exploded perspective view of an RFID tag of the present disclosure. FIG. 2 is a block diagram showing circuit configuration of an RFID tag of an embodiment. FIG. 3 is a plan view of configuration in which a circuit board and a functional module are mounted in a case. FIG. 4 is a vertical sectional view of the RFID tag of the embodiment. In FIG. 3 and FIG. 4, a display 33 is indicated by a long dashed double-short dashed line. FIG. 4 shows a section at the position of an arrowed A-A line in FIG. 3. In this description, directions are described using directions of three axes, X, Y and Z, shown in the drawings. The X axis, Y axis and Z axis are three axes that are at right angles to one another. The X direction, Y direction and Z direction may be referred to as right-left/lateral direction, up-down direction and front-back direction, respectively. However, it is unnecessary that the directions described in this description are the same as directions of an RFID tag 1 in use.

A case 10 is concave with one side opened, and can accommodate a circuit board 20 and the display 33 on top of one another and two photovoltaic panels 31, 32 on the left and right of the display 33. The case 10 is made of, as a main material, engineering plastic, such as ABS (acrylonitrile butadiene styrene resin), PC (polycarbonate), POM (polyacetal), PP (polypropylene), PPS (polyphenylene sulfite), PA (polyamide), EVA (ethylene vinyl acetate copolymer), PE (polyethylene), PBT (polybutylene terephthalate), PS (polystyrene), EP (epoxy resin) or PF (phenolic resin), and formed, for example, by injection molding. The case 10 may be formed of a mixture of any of the above materials as a main material with another material, or may be formed of such a material further containing inorganic filler.

The display 33 is, for example, a liquid crystal display panel, and electrically connected to the circuit board 20 through a wiring (e.g. a film wiring) 33h. The display 33 may have a shape of a rectangular plate. The wiring 33h may be detachably connected to the circuit board 20 through a connector thereon.

The photovoltaic panels 31, 32 generate electric power by receiving light from outside. Each of the photovoltaic panels 31, 32 may have a shape of a rectangular plate. The photovoltaic panels 31, 32 are electrically connected to the circuit board 20 through wirings (e.g. lead wires) 31h, 32h. The wirings 31h, 32h may be detachably connected to the circuit board 20 through connectors thereon.

A lid 40 has transparent windows 41a to 41c in areas respectively facing the photovoltaic panels 31, 32 and the display 33, and is joined to the inner frame 10a of the case 10 to close the opening of the case 10 and seal off the case 10.

As shown in FIG. 2, the RFID tag 1 includes a PMIC (Power Management Integrated Circuit) 21 that receives generated power from the photovoltaic panels 31, 32 and manages the power, a first power supply IC 22 that receives power from the PMIC 21 and generates a power supply voltage for a control system, and a second power supply IC 23 that receives power from the PMIC 21 and generates a drive voltage for the display 33. The RFID tag 1 also includes an RFID IC 25 that performs wireless communication with a reader/writer through radio waves and a control circuit 24 that communicates with the RFID IC 25 and controls display of the display 33. The control circuit 24 and the RFID IC 25 operate by receiving the power supply voltage from the first power supply IC 22. The RFID IC 25 performs wireless communication by using, for example, radio waves in the UHF (Ultra High Frequency) band. The RFID IC 25 includes a reader/writer readable/writable storage. In the storage, identification information, management information and/or the like is stored. The control circuit 24 is, for example, a microcomputer, and can read out the information in the storage of the RFID IC 25 by communicating with the RFID IC 25. The control circuit 24 controls display content of the display 33 on the basis of the read-out information. The PMIC 21, the first power supply IC 22, the second power supply IC 23, the control circuit 24 and the RFID IC 25 are mounted on the circuit board 20.

As shown in FIG. 3, the circuit board 20 has a main part 20A extending in the X, Y directions and an extended part 20B extending along the upper side (edge) of the main part 20A and extending long on both sides of the main part 20A in the X direction. In FIG. 3, a border line E1 is an imaginary border line E1 between the main part 20A and the extended part 20B. The main part 20A may be rectangular in plan view.

On the main part 20A, the control circuit 24, the PMIC 21, the first power supply IC 22, the second power supply IC 23, a connector for a display panel, connectors for photovoltaic panels and so forth are mounted. Although not shown in FIG. 3, these are mounted on the back side (back/rear, rear surface) of the circuit board 20 in FIG. 3. The RFID IC 25 may be mounted on the main part 20A, on the extended part 20B or at the border between the main part 20A and the extended part 20B as long as the RFID IC 25 is near the border and connected to an antenna conductor 28. The main part 20A may have approximately the same lateral width as the display 33.

The extended part 20B includes the antenna conductor 28 and is integrated with the main part 20A. The antenna conductor 28 is formed on a surface (e.g. rear surface in FIG. 1 and FIG. 2) of the circuit board 20. An electromagnetic field that is radiated from the antenna conductor 28 is radiated in all directions in the YZ plane perpendicular to the longer direction of the antenna conductor 28 (X direction). The antenna conductor 28 may be formed on an interlayer of the circuit board 20.

The antenna conductor 28 includes a linear part 28a for radio wave radiation that resonates at the frequency of a radio signal and a pattern part 28b for impedance matching. The linear part 28a may extend in the X direction to areas where the photovoltaic panels 31, 32 are arranged. The linear part 28a is longer than the lateral width of the main part 20A, and extends longer than the main part 20A in one direction and the other direction of the X direction. The linear part 28a may constitute a dipole antenna having an electrical length that is a length of about a half wavelength of a radio signal of the RFID IC 25. The pattern part 28b has, for example, a loop-shaped pattern, and is disposed between the linear part 28a and a feeding point for the RFID IC 25 and matches impedances of these.

<Holding Structure>

As shown in FIG. 1, a plurality of ribs (r1 to r5) protruding in the Z direction is disposed on the inner bottom surface S2 of the case 10. The ribs include, for example, ribs r1 that abut the circuit board 20 to separate the circuit board 20 from the inner bottom surface S2, ribs r2 that abut the circuit board 20 from the X, Y directions to restrict movement of the circuit board 20 in the X, Y directions, and ribs r3a, r3b that abut the photovoltaic panels 31, 32 to hold the photovoltaic panels 31, 32. The ribs further include side ribs r4 and a central ribs r5 that support the extended part 20B of the circuit board 20 from the inner bottom surface S2 side of the case 10. The ribs r1, r2, r3a, r3b are not limited to those shown in FIG. 1 in shape, and may be of any shape as long as they fulfill the abovementioned functions. The side ribs r4 and the central rib r5 may also be of any shape as long as they fulfill the abovementioned function and do not inhibit the undermentioned effect(s). In this description, the ribs mean protrusions protruding from the inner surface of the case 10 and include, for example, bosses.

As shown in FIG. 3 and FIG. 4, the display 33 overlaps the main part 20A of the circuit board 20 in the Z direction and does not overlap the extended part 20B in the Z direction. The display 33 may overlap the pattern part 28b and the extended part 20B as long as it does not overlap the linear part 28a of the antenna conductor 28.

The circuit board 20 is restricted from moving in the −Z direction and the XY plane direction by the ribs r1, r2 abutting the circuit board 20 from the −Z direction and the XY plane direction. The circuit board 20 is also restricted from moving in the +Z direction by the display 33 overlapping the circuit board from the +Z direction, thereby being an obstacle in the +Z direction. The display 33 is restricted from moving in the +Z direction by the lid 40 covering the display 33 from the +Z direction. Thus, the circuit board 20 is held in the case 20.

The ribs r1, r2 are arranged so as to abut the main part 20A of the circuit board 20 mainly and not to abut the extended part 20B thereof. The ribs r1, r2 may be arranged so as to abut part of the extended part 20B as long as they do not overlap the antenna conductor 28 as viewed in the Z direction (direction perpendicular to the board surface of the circuit board 20).

The display 33 is also restricted from moving in the XY plane direction with respect to the circuit board 20 by being connected to the circuit board 20 through the wiring (e.g. film wiring) 33h. The display 33 may be restricted from moving in the X, Y directions by the ribs r2 being made to protrude more so as to also abut the display 33 from the XY plane direction.

This holding structure holds the circuit board 20 such that the circuit board 20 is separate from the lid 40 and also separate from the inner bottom surface S2 of the case 10. Hence, of the circuit board 20, a part(s) that does not overlap any of the display 33 and the ribs r1, r2 as viewed in the Z direction is kept in midair. The "kept in midair" means that a target part is kept with spaces between the lid 40 and itself and between the case 10 and itself.

The side ribs r4 and the central rib r5 support the extended part 20B, most of which is kept in midair, from the −Z direction to reduce stress that is generated between the main part 20A and the extended part 20B when impact is applied to the RFID tag 1 and also to suppress vibration of the extended part 20B when external force is applied to the RFID tag 1.

As shown in FIG. 3, the left side rib r4 is disposed between the left end of the extended part 20B in the longer direction thereof (X direction) and the left end of the antenna conductor 28 in the longer direction thereof (X direction) as viewed in the Z direction. The side ribs r4 are narrow in the longer direction of the extended part 20B (X direction) and wide in the shorter direction of the extended part 20B (Y direction). The left side rib r4 may be positioned 1 mm or more leftward from the left end of the antenna conductor 28. The right side rib r4 is the same as the left side rib r4 except that they are symmetrical in arrangement and structure.

As shown in FIG. 3, the central rib r5 is arranged at the central part of the linear part 28a of the antenna conductor 28 in the longer direction thereof so as to overlap the linear part 28a and not to overlap the pattern part 28b as viewed in the Z direction. The central rib r5 is narrow in the longer direction of the extended part 20B (X direction) and wide in the shorter direction of the extended part 20B (Y direction).

As shown in FIG. 3, as viewed in the Z direction, the photovoltaic panels 31, 32 are arranged in both armpit parts two sides of each of which are delimited by the main part 20A and the extended part 20B of the circuit board 20. Further, as shown in FIG. 4, as viewed in a direction along the XY plane, the photovoltaic panels 31, 32 are arranged so as to overlap the display 33 and not to overlap the circuit board 20. As viewed in the direction along the XY plane, the photovoltaic panels 31, 32 may be arranged at a height where they do not overlap the display 33 or may be arranged at a height where they overlap the circuit board 20.

The photovoltaic panels 31, 32 are restricted from moving in the −Z direction and the XY plane direction by the ribs r3a, r3b abutting the photovoltaic panels 31, 32 from the −Z direction and the XY plane direction, and restricted from moving in the +Z direction by the lid 40 covering the photovoltaic panels 31, 32 from the +Z direction. Thus, the photovoltaic panels 31, 32 are held in the case 10.

<Antenna Characteristics>

Next, antenna characteristics of the RFID tag 1 of the embodiment will be described. First, antenna characteristics of an RFID tag in which the side ribs r4 and the central rib r5 are not provided and accordingly the entire extended part 20B is kept in midair will be described.

Figure 5A:
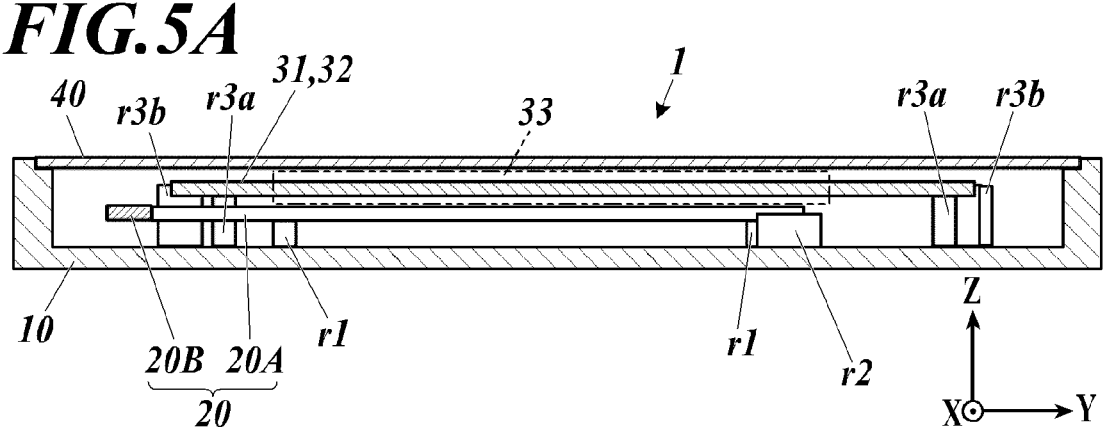
FIG. 5A is a vertical sectional view of an RFID tag in which an extended part is kept in midair.
Figure 5B:
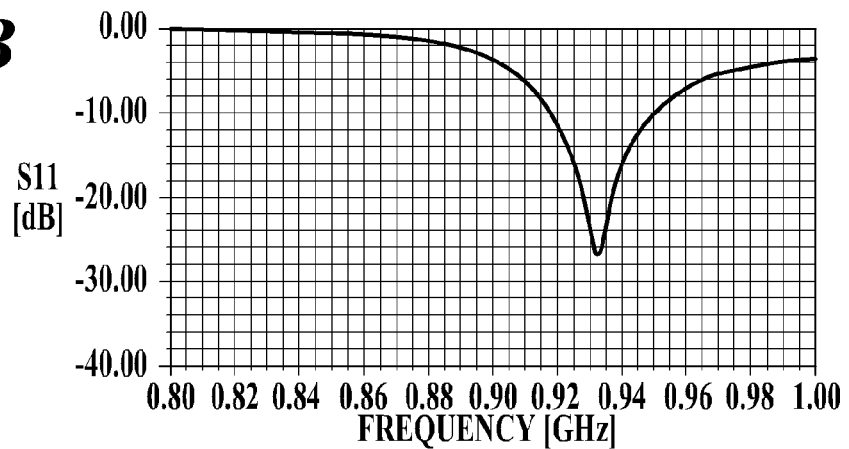
FIG. 5B is a graph of frequency response of an antenna conductor of the RFID tag shown in FIG. 5A.
Figure 5C:
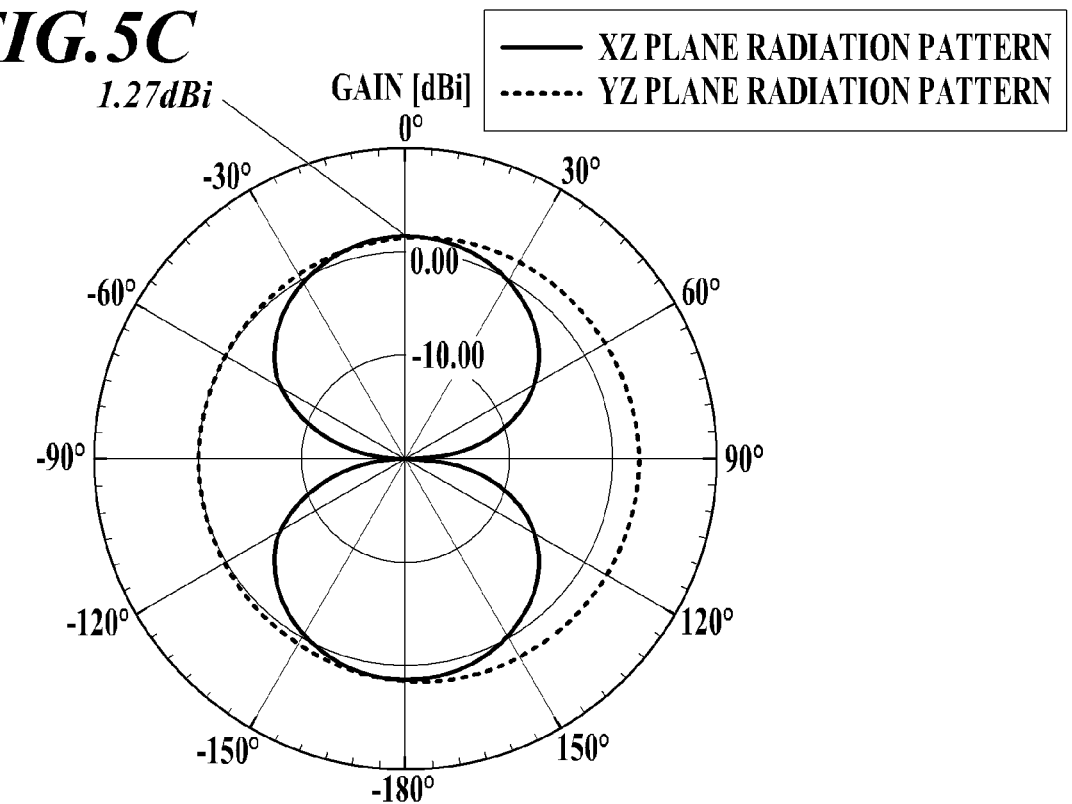
FIG. 5C is a graph of antenna gain of the RFID tag shown in FIG. 5A.

FIG. 5A is a vertical sectional view of an RFID tag in which an extended part is kept in midair. FIG. 5B is a graph of frequency response of an antenna conductor of the RFID tag shown in FIG. 5A. FIG. 5C is a graph of antenna gain of the RFID tag shown in FIG. 5A. The frequency response in FIG. 5B indicates magnitude of a returned signal (return loss S11 [dB]) at the time of input of a high-frequency signal of each frequency shown on the horizontal axis to the feeding point of the antenna conductor 28. The feeding point corresponds to a connection point of the RFID IC 25. In the graph shown in FIG. 5C, 0° represents the +Z direction of the XZ plane and the YZ plane, and +90° represents the +X direction of the XZ plane and the +Y direction of the YZ plane. These apply to graphs of frequency response and graphs of antenna gain shown in FIG. 6, FIG. 7, FIG. 9 and FIG. 10 too. The frequency response and the antenna gain of the antenna conductors 28 are results of simulations.

In the simulation of the configuration in which the side ribs r4 and the central rib r5 are not provided and accordingly the entire extended part 20B is kept in midair (shown in FIG. 5A), as shown in FIG. 5B, the minimum return loss S11 was observed near 920 MHz. That is, a good characteristic was obtained. Further, as shown in FIG. 5C, the antenna gain in the +Z direction at 920 MHz was 1.27 dBi. That is, a good characteristic was obtained. In the simulation of this configuration, the length of the linear part 28a of the antenna conductor 28 was 114 mm.

Figure 6A:
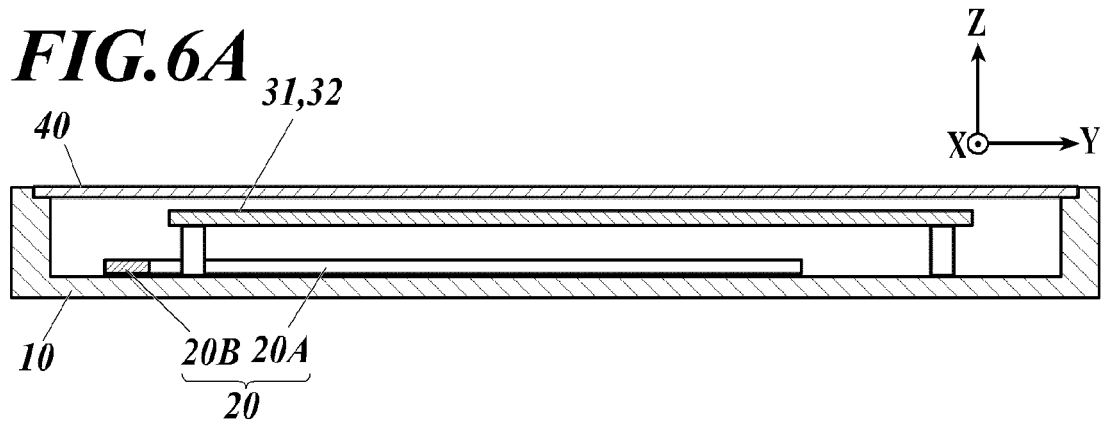
FIG. 6A is a vertical sectional view of an RFID tag of a first comparative example.
Figure 6B:
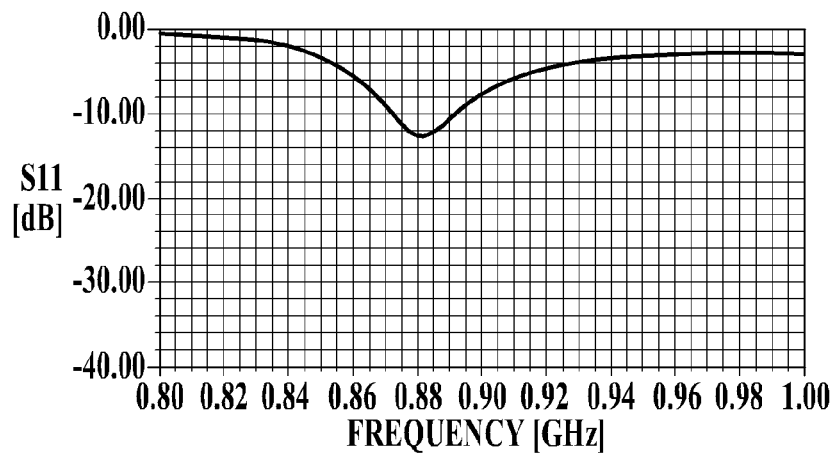
FIG. 6B is a graph of frequency response of an antenna conductor of the RFID tag shown in FIG. 6A.
Figure 6C:
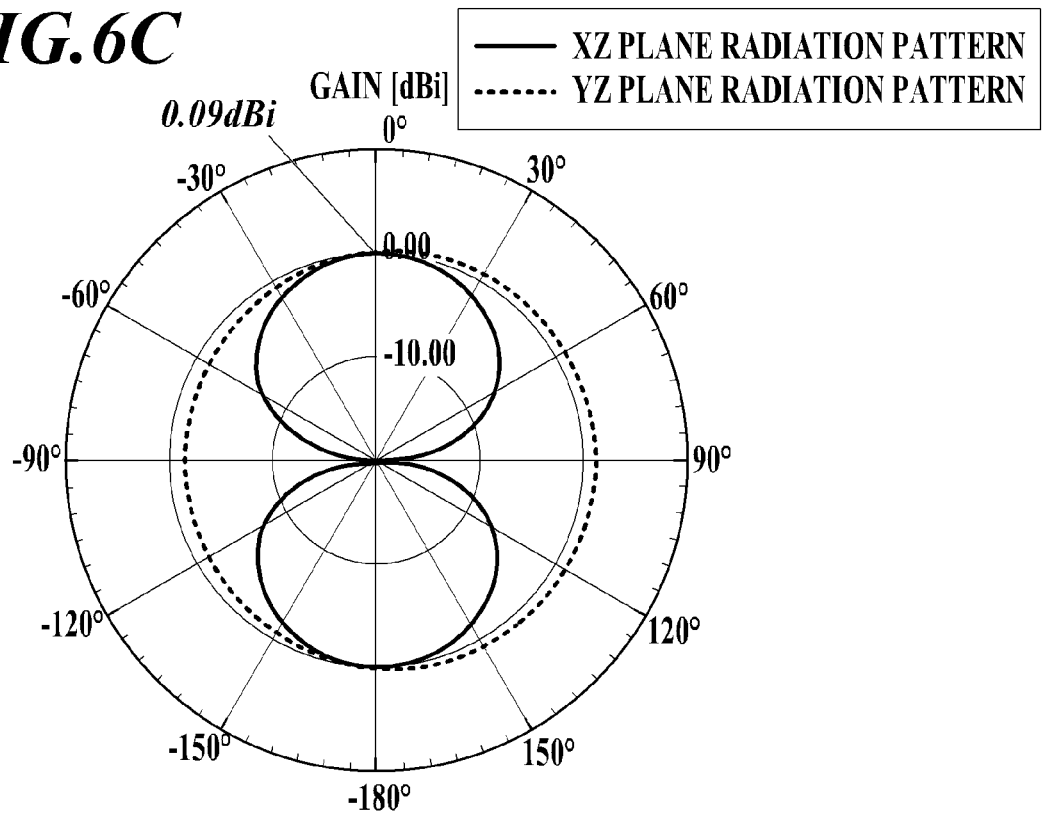
FIG. 6C is a graph of antenna gain of the RFID tag shown in FIG. 6A.

FIG. 6A is a vertical sectional view of an RFID tag of a first comparative example. FIG. 6B is a graph of frequency response of an antenna conductor of the RFID tag shown in FIG. 6A. FIG. 6C is a graph of antenna gain of the RFID tag shown in FIG. 6A. The first comparative example is an example in which the circuit board 20 was arranged close to the inner bottom surface S2 of the case 10 (shown in FIG. 6A). In the simulation of the first comparative example, the length of the antenna conductor 28 was not changed from the length described with reference to FIG. 5A. However, since the antenna conductor 28 was close to resin, which has a higher relative permittivity than air, the frequency at which the minimum return loss S11 was observed shifted from 920 MHz to the lower frequency side (shown in FIG. 6B).

In the configuration of the first comparative example, since the return loss S11 at 920 MHz was large, namely −10 dB or greater, a signal radiated from the antenna was small, and the antenna gain in the +Z direction at 920 MHz decreased to 0.09 dBi as shown in FIG. 6C.

Figure 7A:
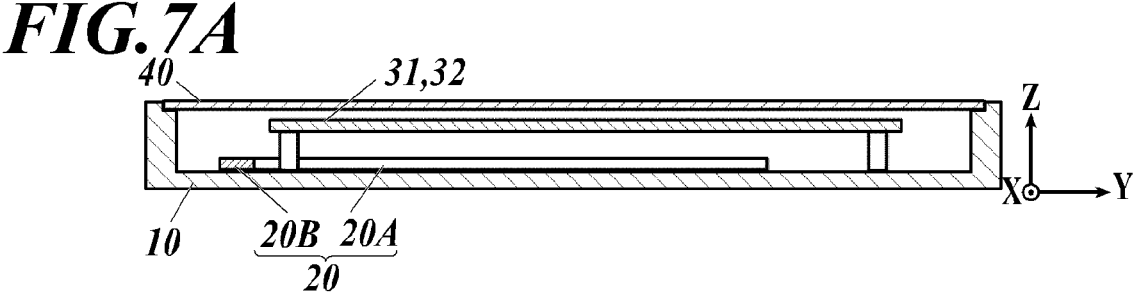
FIG. 7A is a vertical sectional view of an RFID tag of a second comparative example.
Figure 7B:
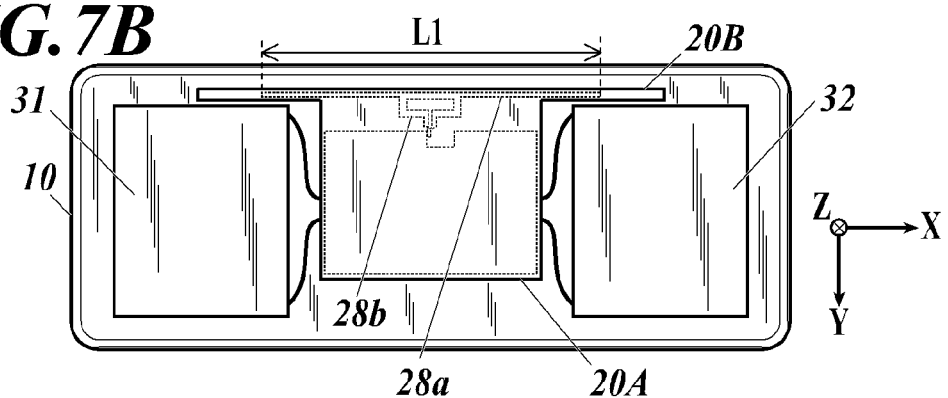
FIG. 7B is a plan view of the RFID tag shown in FIG. 7A.
Figure 7C:
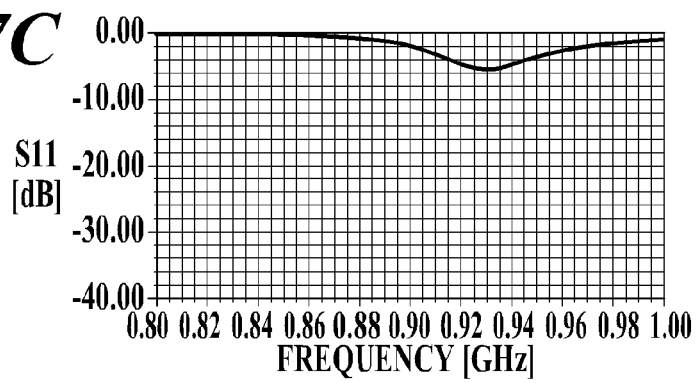
FIG. 7C is a graph of frequency response of an antenna conductor of the RFID tag shown in FIG. 7A.
Figure 7D:
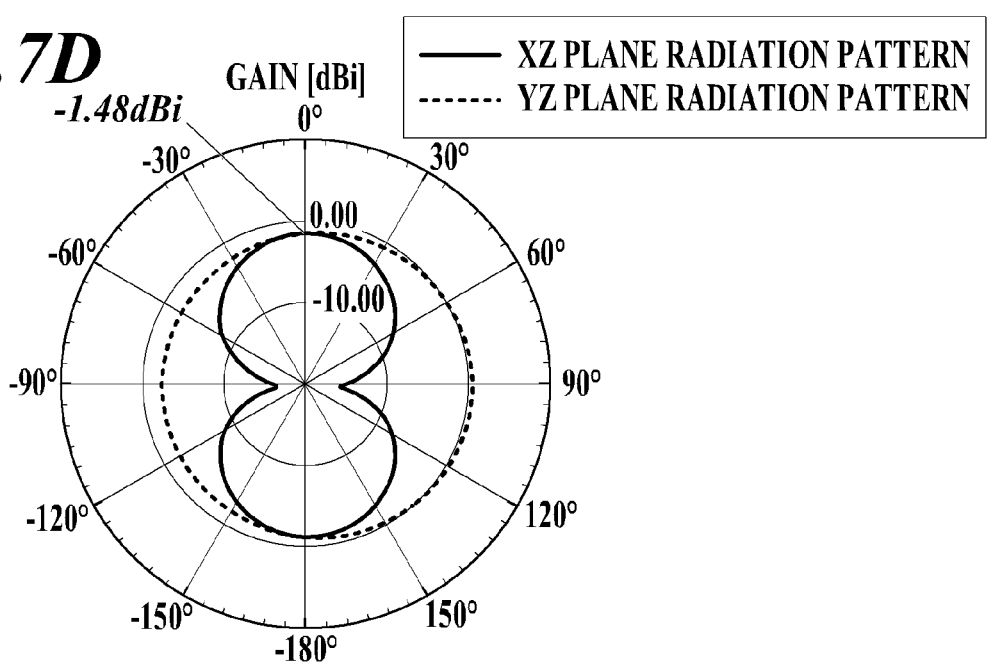
FIG. 7D is a graph of antenna gain of the RFID tag shown in FIG. 7A.

FIG. 7A is a vertical sectional view of an RFID tag of a second comparative example. FIG. 7B is a plan view of the RFID tag shown in FIG. 7A. FIG. 7C is a graph of frequency response of an antenna conductor of the RFID tag shown in FIG. 7A. FIG. 7D is a graph of antenna gain of the RFID tag shown in FIG. 7A. In the simulation of the second comparative example, the circuit board 20 was arranged close to the inner bottom surface S2 of the case 10 (shown in FIG. 7A), and the length L1 of the linear part 28a of the antenna conductor 28 was adjusted to be short, from 114 mm to 94 mm, so that the minimum value of the return loss S11 appeared near 920 MHz (shown in FIG. 7B and FIG. 7C).

In the configuration of the second comparative example, the deviation of the electrical length of the antenna conductor 28 was solved, but, since the antenna conductor 28 was adjusted to be short, the antenna gain in the +Z direction at 920 MHz decreased to −1.48 dBi as shown in FIG. 7D.

In the configuration of the second comparative example too, the value of the return loss S11 at 920 MHz was −10 dB or greater (shown in FIG. 7C). That is, the returned signal was large. The return loss S11 at 920 MHz can be reduced from the characteristic shown in FIG. 7C by adjusting the pattern part 28b for impedance matching. However, according to a simulation thereof, even when such impedance matching was performed, the antenna gain only increased to 0.21 dBi (not shown), which is not as high as the antenna gain of the configuration in which the extended part 20B was kept in midair, namely 1.27 dBi (FIG. 5C). As it can be understood by comparing the simulation results shown in FIG. 5 with those of the second comparative example, the RFID tag 1 of the embodiment obtains a high antenna gain and a long communicable distance by having the extended part 20B kept in midair.

Next, antenna characteristics of an RFIG tag in which the side ribs r4 and/or the central rib r5 are provided will be described.

FIG. 8 shows field intensity of an antenna conductor. As shown in FIG. 8, in the antenna conductor 28 having the linear part 28a and the pattern part 28b, which performs impedance matching, constituting a dipole antenna, if the linear part 28a is divided into three areas of the left area, the central area and the right area, strong electric fields are generated in the left area and the right area, in particular, at the left end and the right end of the linear part 28a. A strong electric field is also generated near the feeding point of the antenna conductor 28.

Meanwhile, no strong electric field is generated in the central area of the linear part 28a, and the intensity of generated electric fields shows steep decrease on the left of the left end and the right of the right end of the antenna conductor 28. The above-described arrangement positions of the two side ribs r4 and the central rib r5 are set at points where no strong electric fields are generated as shown in FIG. 8.

Figure 9A:
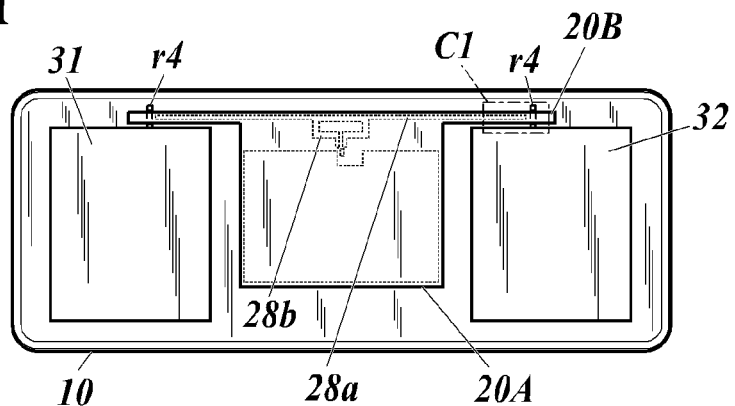
FIG. 9A is a plan view of an RFID tag in which an extended part is kept in midair with side ribs.
Figure 9B:
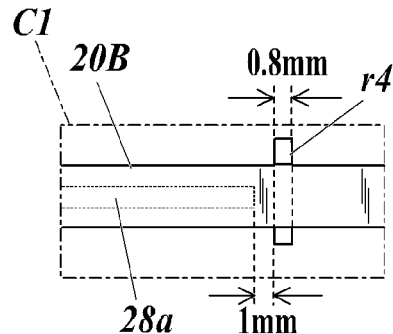
FIG. 9B is an enlarged view of a part of the RFID tag shown in FIG. 9A.
Figure 9C:
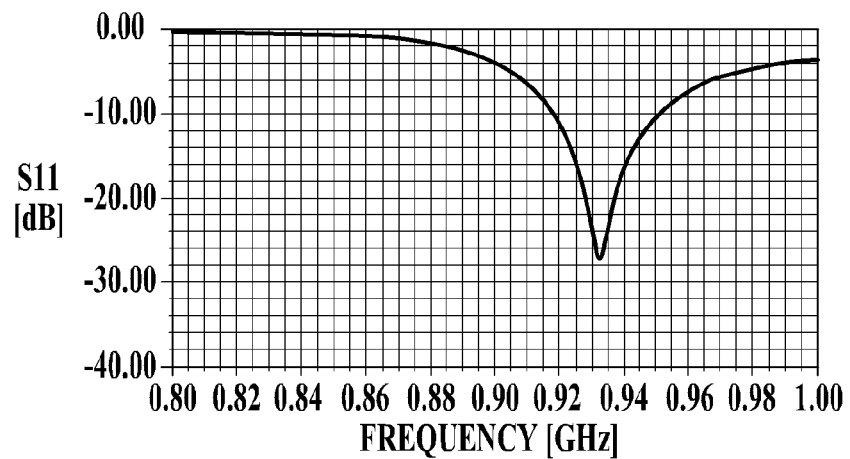
FIG. 9C is a graph of frequency response of an antenna conductor of the RFID tag shown in FIG. 9A.
Figure 9D:
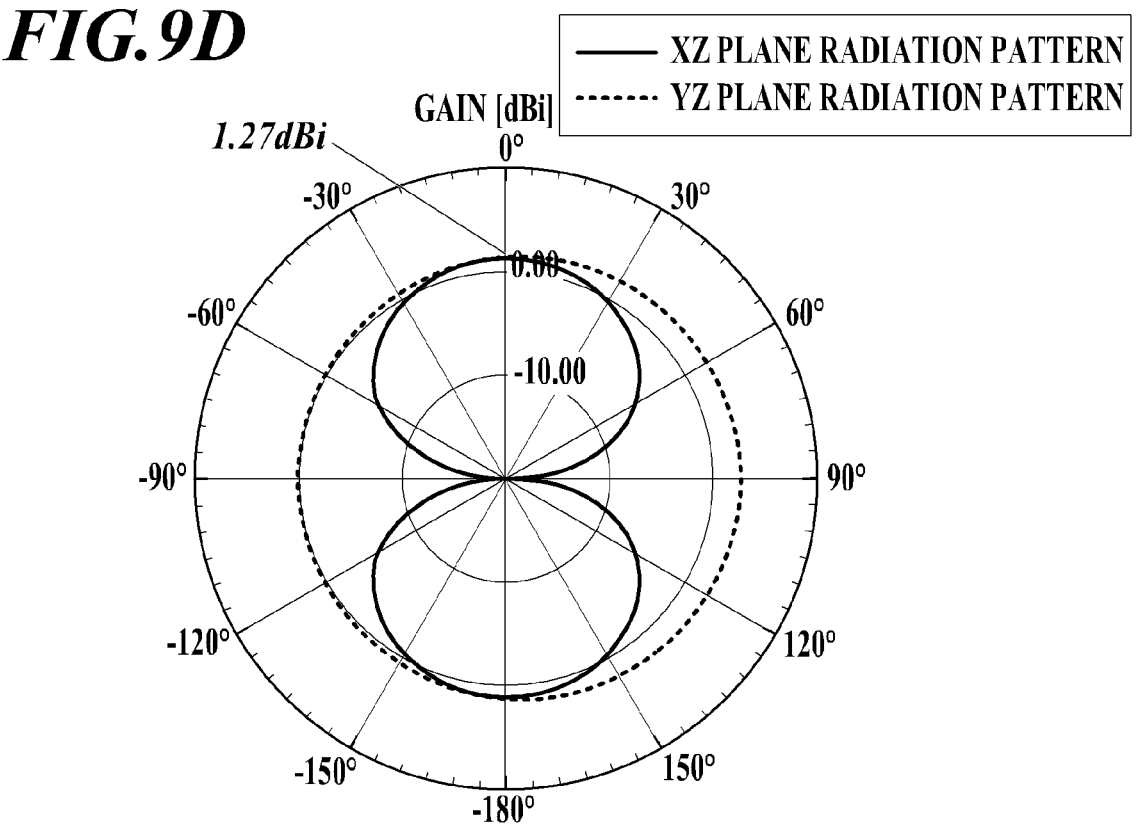
FIG. 9D is a graph of antenna gain of the RFID tag shown in FIG. 9A.
Figure 10A:
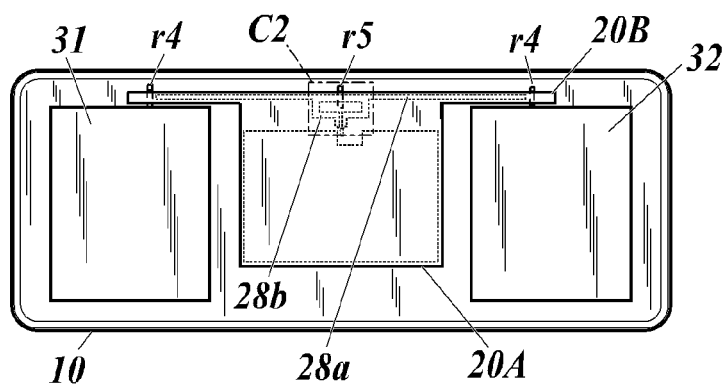
FIG. 10A is a plan view of an RFID tag in which an extended part is kept in midair with side ribs and a central rib.
Figure 10B:
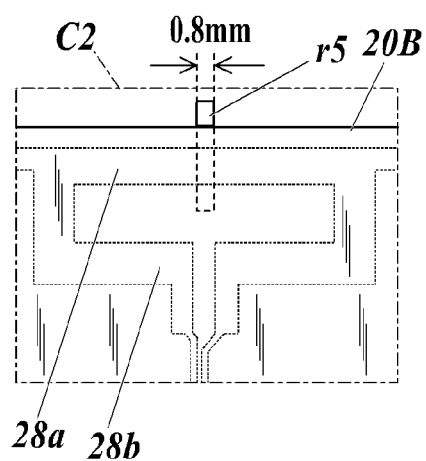
FIG. 10B is an enlarged view of a part of the RFID tag shown in FIG. 10A.
Figure 10C:
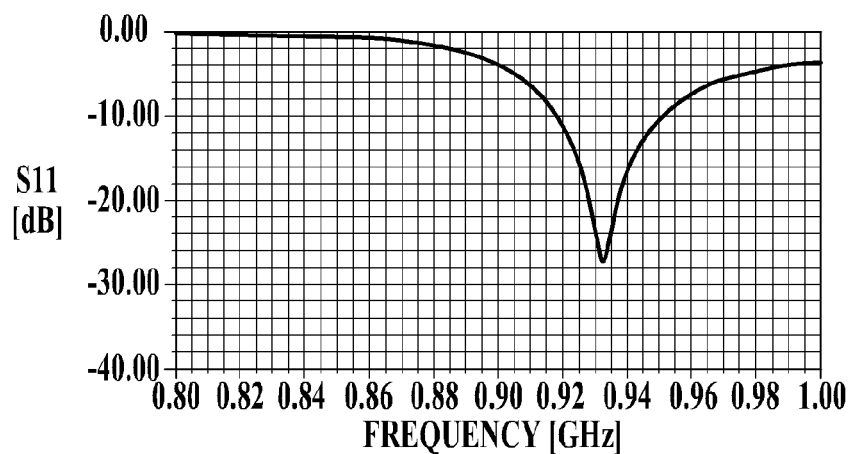
FIG. 10C is a graph of frequency response of an antenna conductor of the RFID tag shown in FIG. 10A.
Figure 10D:
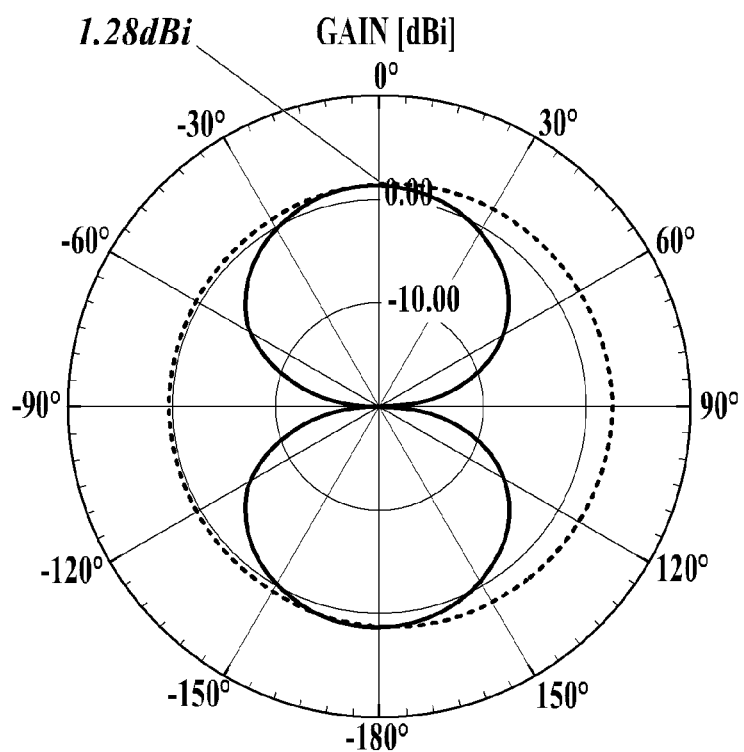
FIG. 10D is a graph of antenna gain of the RFID tag shown in FIG. 10A.

FIG. 9A is a plan view of an RFID tag in which an extended part is kept in midair with side ribs. FIG. 9B is an enlarged view of a part C1 of the RFID tag shown in FIG. 9A. FIG. 9C is a graph of frequency response of an antenna conductor of the RFID tag shown in FIG. 9A. FIG. 9D is a graph of antenna gain of the RFID tag shown in FIG. 9A. FIG. 10A is a plan view of an RFID tag in which an extended part is kept in midair with side ribs and a central rib. FIG. 10B is an enlarged view of a part C2 of the RFID tag shown in FIG. 10A. FIG. 10C is a graph of frequency response of an antenna conductor of the RFID tag shown in FIG. 10A. FIG. 10D is a graph of antenna gain of the RFID tag shown in FIG. 10A.

In the simulations shown in FIG. 9 and FIG. 10, the side ribs r4 were 1 mm away from their corresponding ends of the linear part 28a and had a width of 0.8 mm (shown in FIG. 9B). In the simulation shown in FIG. 10, the central rib r5 had a width of 0.8 mm (shown in FIG. 10B). In the simulations shown in FIG. 9 and FIG. 10, the length of the linear part 28a was the same as the length set in the simulation shown in FIG. 5.

As shown in FIG. 9C and FIG. 10C, in the configurations in which the side ribs r4 and/or the central rib r5 were provided, the frequency at which the minimum return loss S11 was observed did not change as compared with that shown in the graph of the return loss S11 in the case where the entire extended part 20B was kept in midair (FIG. 5B). Further, as shown in FIG. 9D and FIG. 10D, in the configurations in which the side ribs r4 and/or the central rib r5 were provided, the antenna gains in the +Z direction at 920 MHz were 1.27 dBi and 1.28 dBi, respectively. That is, good characteristics were obtained. In other words, the obtained results show that the side ribs r4 and the central rib r5 do not adversely affect either the electrical length or the antenna gain of the antenna conductor 28.

As described above, according to the RFID tag 1 of the embodiment, the main part 20A of the circuit board 20 is held by the ribs r1 at a position away from the inner bottom surface S2 of the case 10 with the display 33 as an obstacle in a direction toward the lid 40. This holding structure keeps the extended part 20B of the circuit board 20 in midair. That is, the holding structure can separate the antenna conductor 28 included in the extended part 20B from the case 10 and the lid 40 by making use of the display 33 that is a functional module. This can improve the antenna gain of the antenna conductor 28 and lengthen the communicable distance of the RFID tag 1.

Further, according to the RFID tag 1 of the embodiment, the case 10 has the side ribs r4, and the side ribs r4 support the extended part 20B at positions that are away from the antenna conductor 28 across the ends of the antenna conductor 28 as viewed in the Z direction. Thus, the side ribs r4 support the extended part 20B, and thereby can suppress generation of large stress between the main part 20A and the extended part 20B of the circuit board 20 when the RFID tag 1 receives impact, and also can suppress generation of vibration of the extended part 20B. Further, the side ribs r4 are arranged as described above, and thereby can suppress their influence on the antenna characteristics, and consequently can support the extended part 20B without reducing the antenna gain.

Further, according to the RFID tag 1 of the embodiment, the case 10 has the central rib r5, and the central rib r5 supports the extended part 20B at the position of the center of the linear part 28a in the longer direction thereof as viewed in the Z direction. Thus, the central rib r4 supports the extended part 20B, and thereby can suppress generation of large stress between the main part 20A and the extended part 20B of the circuit board 20 when the RFID tag 1 receives impact, and also can suppress generation of vibration of the extended part 20B. Further, the central rib r5 is arranged as described above, and thereby can suppress its influence on the characteristics of the antenna conductor 28, and consequently can support the extended part 20B without reducing the antenna gain.

In the above, an embodiment has been described. In the above embodiment, the display is used as the functional module that overlaps the circuit board 20, but, as the functional module that overlaps the circuit board 20, various modules may be used. Examples thereof include: photovoltaic panels; sensor modules that detect temperature, humidity, illuminance, oscillation, acceleration and so forth; sound collectors; and loudspeakers. Further, in the above embodiment, the side ribs r4 and the central rib r5 are provided, but these may be omitted. The details described in the embodiment can be appropriately modified within a range not departing from the scope of the invention.

INDUSTRIAL APPLICABILITY

The present disclosure is applicable to an RFID tag having a structure in which an antenna conductor is accommodated in a case.

The invention claimed is:

1. An RFID tag comprising:
    a circuit board having a main part and an extended part extending along an edge of the main part and including an antenna conductor;
    an RFID IC mounted on the circuit board;
    a functional module disposed so as to overlap the circuit board;
    a case that accommodates the circuit board and the functional module; and
    a lid that closes an opening of the case,
    wherein the main part of the circuit board is held at a position away from an inner bottom surface of the case with the functional module as an obstacle in a direction toward the lid.

2. The RFID tag according to claim 1, wherein the extended part of the circuit board is kept in midair.

3. The RFID tag according to claim 2,
    wherein the case has a side rib that supports the extended part, and
    wherein as viewed in a direction perpendicular to a board surface of the circuit board, the side rib is disposed opposite the antenna conductor across an end of the antenna conductor.

4. The RFID tag according to claim 2,
    wherein the antenna conductor has a linear part for radio wave radiation and a pattern part for impedance matching connected to the linear part,
    wherein the case has a central rib that supports the extended part, and wherein as viewed in a direction perpendicular to a board surface of the circuit board, the central rib is disposed at a center of the linear part.

5. The RFID tag according to claim 3,
wherein the antenna conductor has a linear part for radio wave radiation and a pattern part for impedance matching connected to the linear part,
wherein the case has a central rib that supports the extended part, and
wherein as viewed in the direction perpendicular to the board surface of the circuit board, the central rib is disposed at a center of the linear part.

* * * * *